United States Patent [19]
Reinauer

[11] Patent Number: 5,704,742
[45] Date of Patent: Jan. 6, 1998

[54] ROTARY TOOL

[75] Inventor: Josef Reinauer, Sigmaringen, Germany

[73] Assignee: Joerg Guhring, Albstadt, Germany

[21] Appl. No.: 504,582

[22] Filed: Jul. 20, 1995

[30] Foreign Application Priority Data

Aug. 25, 1994 [DE] Germany .................. 44 30 197.9

[51] Int. Cl.$^6$ .................................................. B23B 27/16
[52] U.S. Cl. ................................................ 408/156; 408/181
[58] Field of Search ........................... 408/156, 181, 408/153

[56] References Cited

U.S. PATENT DOCUMENTS

| | | | |
|---|---|---|---|
| 2,266,339 | 12/1941 | Shutz | 408/156 |
| 2,753,617 | 7/1956 | Felenchak | 407/10 |
| 4,428,704 | 1/1984 | Kalokhe | |
| 4,497,601 | 2/1985 | Negus | 408/156 |
| 4,780,029 | 10/1988 | Beck | 408/156 X |
| 4,930,957 | 6/1990 | Priessnitz | 408/181 X |
| 5,125,773 | 6/1992 | Miyashita et al. | 408/156 |
| 5,396,693 | 3/1995 | Lohner | 408/181 X |

FOREIGN PATENT DOCUMENTS

| | | |
|---|---|---|
| 2125227 | 9/1972 | France . |
| 3607528 C1 | 3/1986 | Germany . |
| 3906197 C2 | 10/1992 | Germany . |
| 4339537 A1 | 7/1994 | Germany . |

*Primary Examiner*—Daniel W. Howell
*Assistant Examiner*—Henry W. H. Tsai
*Attorney, Agent, or Firm*—Oblon, Spivak, McClelland, Maier & Neustadt, P.C.

[57] ABSTRACT

A machining tool for the fine machining of internal surfaces, with a blade carrier and cutting inserts preferably attached releasably thereto. An adjusting device for the precision adjustment of the cutting edge is provided. The blade carrier has at least one slit located closer to the longitudinal axis of the machining tool than is the cutting insert, thus creating a blade carrier segment which can be essentially radially adjusted and which carries the cutting insert and which is connected in one piece with the remaining blade carrier. The degree of freedom of the blade carrier segment permitted by the slit can be stabilized via adjusting device.

19 Claims, 6 Drawing Sheets

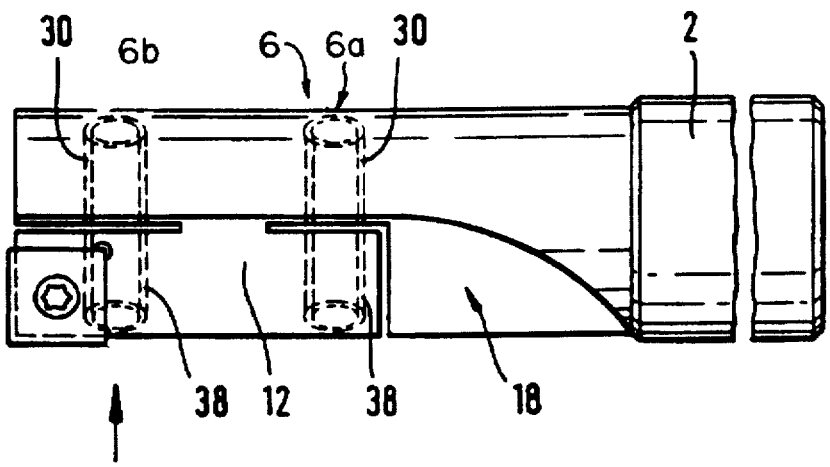
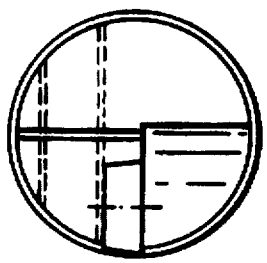
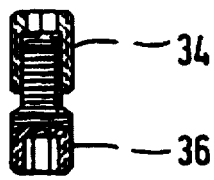
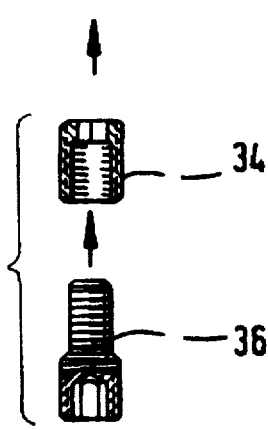
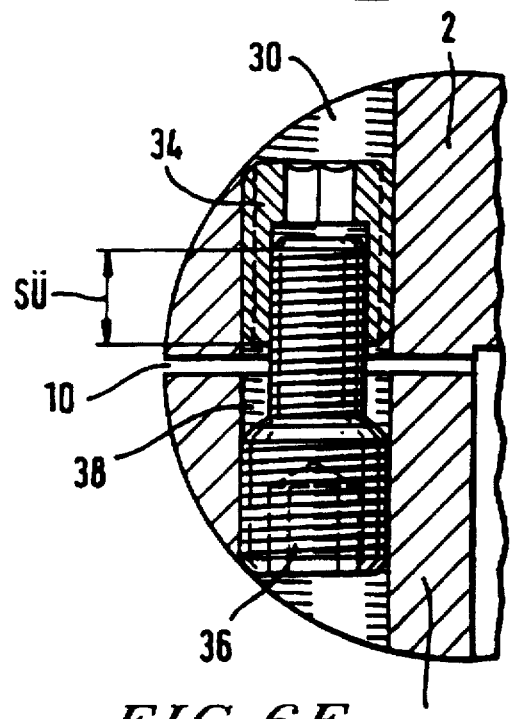

ROTARY TOOL

BACKGROUND OF THE INVENTION

1. Field of the Invention

The invention on hand relates to a rotary tool, in particular a machining tool for the fine machining of internal surfaces, with a blade carrier and cutting inserts preferably attached releasably thereto, in particular indexable inserts according to DIN [German Industrial Norm], whereby an adjusting device for the precision adjustment of the cutting edge is provided.

2. Discussion of the Background

Today's modern manufacturing technology regards the reduction of production steps from the raw part to the finished product in fine machining quality as an important point for cost optimization and time savings. High-speed, stable, high-performance spindles create new opportunities for new rotary tool systems. A high degree of concentricity of the tool and cylindricity of the machined through-bores is required in particular for the machining of through-bores or blind hole bores, such as for example cylinder head bores. Such tools therefore frequently use extremely stable cutting inserts.

For this purpose, a rotary tool is known, on whose blade carrier cutting inserts can be radially aligned by using an adjusting device. The adjusting device consists of a clamping claw which can be fixed with a tension screw on the blade carrier in order to attach the cutting insert, which consists for example of hard metal on the blade carrier, and which also consists of an adjusting screw for the radial alignment of the cutting insert or blade. The clamping claw can hereby be lowered into the machining space. The cutting inserts have on their top side a ground toothing that engages with an identical toothing on the underside of the clamping claw. The toothing extends parallel to the main blade, so that the toothing of the clamping claw remains engaged with the toothing of the blade when the blade is shifted radially in order to adjust the diameter. The adjusting screw is arranged at an angle to the tension screw of the clamping claw in a plane parallel to the end face of the tool and is constructed conically at its tip, so that the conical flank of the adjusting screw is able to act on the inner, lateral surface of the blade in order to be able to push the blade radially outward during the adjustment.

But a significant disadvantage of this tool is that specially ground cutting inserts with a correspondingly precision-ground toothing on their top must be used. The use of any desired cutting inserts, such as for example low-cost indexable inserts according to DIN or ISO norms is not possible with the known tool.

Another disadvantage is that the adjusting screw is only able to exert forces which move the blade radially outward. If, during adjustment of the diameter, it is necessary to shift the blade radially inward, this must be done manually by pressing on the outside, lateral blade surface, creating a significant risk of injury.

In order to be able to fix the blade to the blade carrier, it is also necessary that a precision-manufactured clamping claw with toothing on its underside is used. This increases the necessary number of parts required for assembling the entire tool. A simple clamping of the blade with a screw, as this is the case with standard DIN indexable plates, is not possible with this tool. Care must also be taken that no soil particles are present in the toothing of the clamping claw or in the toothing of the blade, since an accurate alignment of the blade is otherwise made harder.

Handling this tool during blade adjustment also causes problems, since, for the adjustment of the blade the tension screw of the clamping claw must be released from the front while looking at the blade, and the adjusting screw must be driven at an angle from the opposite side. The constant, necessary back and forth movement of the tool makes an accurate, radial adjustment of the cutting inserts more difficult.

Another disadvantage of the known tool is that the adjusting screw secures the blade only against a radially inward movement. A slipping of the blade radially outward is supposed to be prevented by the clamping force of the clamping claw; but this is not guaranteed.

It is therefore the objective of the invention to create a rotary tool which enables both a separation of the two functions of clamping the blade on the one hand and adjustment of the blade on the other hand in such a manner that even standardized cutting inserts with predefined, tolerance-specific measuring deviations can be used.

This objective is realized with the characteristic features of claim 1.

SUMMARY OF THE INVENTION

The dividing of the blade carrier into the blade carrier itself and into at least one blade carrier segment carrying the blade enables the separation of important functions of the blade carrier, i.e. a first function of providing a stable seat for the blade, and a second function of a radial adjustment of the blade. This makes it possible for the first time to tightly fix the blade to the blade carrier without having to limit the adjusting possibility. By using at least one slit which separates the blade carrier from at least one blade carrier segment, whereby the blade carrier segment still remains connected in one piece with the blade carrier, a new degree of freedom is created, which may be used for adjusting the blade tightly fixed to the blade carrier segment. According to the invention, thus not the cutting insert but rather a part of the blade carrier is adjusted by means of a variation of the slit width.

An adjusting device stabilizes the adjusted cutting edge indirectly by stabilizing the blade carrier segment in relation to the blade carrier. Since the blade carrier and the blade carrier segment remain connected in one piece with each other, a high number of parts can be avoided from the start. In addition, the assembly of attachment screws for the blade carrier segment is as a principle eliminated, resulting in the additional advantage that a minimum of parts is placed between blade and blade carrier, which is another benefit for the stability of the tool.

It is also possible that instead of the cutting inserts fixed with a screw to the blade carrier segment, cutting plates are used which are soldered into their seat on the blade carrier segment, thus yet again reducing the number of parts. Depending on the specific application, one or more slits, arranged for example in a star shape, may create one or more star-shaped blade carrier segments whose additionally obtained elasticities or degrees of freedom can be uncoupled from each other.

The at least one slit extends in a straight line in a plane which is essentially parallel to the axis of the drilling tool, then at least one blade carrier segment can be formed which remains connected in the area of the slit base in one piece with the blade carrier in a plane opposite from the tool end face. The blade carrier segment formed in this way now can be considered numerically like a freely projecting bending bar and can thus be easily used in standard calculation methods for determining loads. Another advantage hereby is that a blade carrier segment formed in such a manner can be easily stabilized and already has a relatively large force transfer surface towards the blade carrier, enabling the transfer of high cutting forces without problems.

The area of the slit base at which the blade carrier remains connected to the blade carrier segment forms a material joint which remains between the blade carrier segment and the blade carrier and which can be stabilized by means of two opposing force vectors. This makes it possible to control the tensions in the blade carrier. This can be compared to a freely projecting bending bar, on which a tensile force acts for example in the outer end area, and which is able to support itself with a section located further inward on an opposing force. This system is determined statically and remains stationary, so that the blade which in a sense is adjusted by the two opposing force vectors is permanently stabilized. The direction of action of the force vectors acting in opposing direction to each other can hereby be reversed. It is advantageous that with known material constants all forces occurring in the tool can hereby be calculated, such as for example thrust, tensile, shear, and transverse forces, so that a numerical simulation can be used for the tool for the purpose of optimization.

In another embodiment, if the adjusting device has at least one adjusting element and one fixing element, then the user can clearly determine which means are to be used to adjust the blade radially and which means are to be used to fix the adjusted blade in its position. The adjusting element can hereby be associated with one force vector, and the fixing element with the other force vector.

In still another embodiment, the adjusting device is formed by a pair of parallel and axially stacked control elements whose axes extend preferably vertically to the slit. In this way it is possible to associate each of the opposing force vectors with a control element. The control elements enable a very fine and accurate radial adjustment of the blade fixed to the blade carrier segment. Access to the control elements is possible, in relation to the cutting edge, from two sides, whereby the function may remain the same on both sides. With a corresponding design, access to the control elements for their operation can be provided for example from the front, with a view towards the cutting insert, enabling a permanent optical or metrological control of the adjustment process, so that an extremely precise adjustment of the cutting insert can be performed in the μ-range.

If the control elements according to another embodiment are formed by screw/nut tension devices, this results in a particularly space-saving design which, with a corresponding selection of the threads, may result in an extremely fine reduction, so that adjustments of the cutting insert which are accurate in the μ-range can be relatively easily realized. Depending on the choice of the thread direction, a movement of the blade carrier segment and thus of the cutting insert into the plus range, i.e. an increase in diameter, is performed for example in case of a rotation to the right, regardless of the fact whether access to the control elements is provided from the front or the back. In the case of a rotation to the left, the reverse happens, i.e. the diameter becomes smaller. Since both control elements are always kept under tension, it is ensured that the adjusted position of the cutting insert is maintained and is not adjusted in the insert during the machining of workpieces. The clamping devices can hereby be constructed in such a size that the weakening of the blade carrier through the slit is largely compensated.

In still a further embodiment, the screw/nut tension devices are constructed in accordance with the differential thread principle. This offers the advantage that a relatively high output force can be achieved with a relatively small drive force which can be exerted manually, for example.

In another embodiment, the screw/nut tension devices are formed in two parts of a setscrew and a threaded jacket. This advantageously enables a simple and cost-efficient use of standard commercial setscrews and threaded jackets. Depending on tool geometry and the width of the slit, this variation easily allows an adjusting range of at least ±0.2 mm, i.e. a radial shift of at least ±0.1 mm and more per cutting insert.

In still another embodiment, the screw/nut tension device is formed in two parts from a stepped setscrew and a threaded jacket. The advantage of this Variation II over the Variation I discussed in the embodiment above is mainly that the production and assembly of the adjusting device for adjusting the blades can be simplified even more. For the production, a continuous thread G1' in the blade carrier and in the blade carrier segment which is separated from the blade carrier by the slit is sufficient. The preassembled screw/nut tension unit consisting of the stepped setscrew with a larger thread G1 and a smaller thread G2, as well as a threaded jacket having an internal thread of the type G2 and an external thread G1, is inserted into such a threaded through-bore. This preassembly is installed in a state where the threaded jacket is screwed with a certain axial residual play onto the smaller thread G2 of the stepped screw. In this preassembled state, this preassembly can be screwed into the threaded through-bore of the tool, initially until one of the components strikes the internal thread which is reached later. By means of a relative rotation between the threaded jacket and the stepped setscrew, the later arriving external thread section is now synchronized with the internal thread, whereupon both elements (threaded jacket, stepped setscrew) are preferably rotated, synchronized in the threaded bore by using suitable tools (hexagon socket screw key) until the suitable end position (without force) of the preassembly in the threaded bore is reached.

The special part here is that now regardless of which part of the preassembly is driven, the other part is automatically kept stationary by the higher friction moment (larger thread diameter), so that the driven part is turned relative to the stationary part. Due to the difference in pitches between thread sections G1 and G2 (the analog applies here to the thread sections G1 and G2 according to Variation I also), the rotary drive movement of one part results in a relative movement of the sections of the blade carrier segment separated by the slit. When providing a right thread on sections G1 and G2, the clockwise rotation of the components results in a pushing away of the sections of the blade carrier segment separated by the slit; in case of a counter-clockwise rotary drive movement, an approaching, i.e. attracting movement, takes place. In this manner the diameter on which the blades are located can not only be moved to the positive, but can also be pushed in the opposite direction, i.e. inward. A tool with which diameter adjustments in the range of 0.3 mm can be achieved has already been practically realized.

Another advantage of this Variation II is that the adjustment of the blade is possible from both sides of the screw/nut tension device. This makes it possible to observe the blade which is being adjusted from the side at which the adjusting tool is being applied.

In still a further embodiment, if two slits are provided, so that the blade carrier segment is connected in one piece with the blade carrier by means of a material bridge remaining between the two slits, this advantageously results in an adjustment of the blade carrier segment which carries the blade in the manner of a swing or seesaw. This seesaw can be supported on both sides or on one side of the material bridge only, and thus can be made stationary. This results in two basic systems, whereby one can be compared to a centrally supported bending bar at whose both end sections tensile or thrust forces act, and the other to a centrally supported bending bar at whose one end tensile and thrust forces act. These two basic systems again are determined statically and remain stationary, so that in a corresponding sense the blade adjusted by means of the two opposing force vectors is permanently stabilized. The direction of action of the opposing force vectors can hereby be reversed. It is advantageous that, with known material constants, all forces occurring in the tool can hereby be calculated, such as for example thrust, tensile, shear, and transverse forces, so that a numerical simulation can be used for the tool for the purpose of optimization.

In another embodiment, both slits are located at least partially in a mutual plane, whereby each slit is associated with an adjusting device. The advantageous arrangement of the lines of action of the opposing force vectors on both sides of the material bridge results in a kind of swing or seesaw. This seesaw can be brought to rest by support on both sides of the material bridge, i.e. the blade carrier segment with the blade insert can be very precisely adjusted and stabilized with it.

In still another embodiment, the material bridge has a cross-section surface, the largest extension of which is oriented in peripheral direction. This advantageously ensures that the resistance against a bending of the material bridge around a radially oriented axis is significantly smaller than that around an axis oriented in the longitudinal axis of the tool. The cross-section is hereby oriented so that the main cutting forces on the blade extend essentially parallel to the larger extension of the cross-section, i.e. in the peripheral direction.

Other advantageous embodiments of the subject of the invention are also claimed.

The force translation can be adapted advantageously to the remaining material bridge by means of the difference in thread pitches. The position of the material bridge is preferably such that the main cutting forces are introduced at a favorable point from the blade via the blade carrier segment into the blade carrier.

A main area of application of this invention is the field of tools using so-called DIN or ISO indexable inserts which are regularly manufactured with a certain tolerance range, so that the desired accuracies frequently cannot be adjusted without further measures. Another advantage of the invention is also that this technology is suitable for tools with soldered-in blades which are retrofitted to the function principle.

A possible embodiment of the tool according to the invention is explained in more detail below in reference to the drawings.

BRIEF DESCRIPTION OF THE DRAWINGS

FIG. 6 shows a schematic flow-chart during the partial assembly of the tool according to the invention;

In the figures, identical reference numbers have been used for parts of different embodiments which correspond functionally.

DESCRIPTION OF THE PREFERRED EMBODIMENTS

Figure 1:
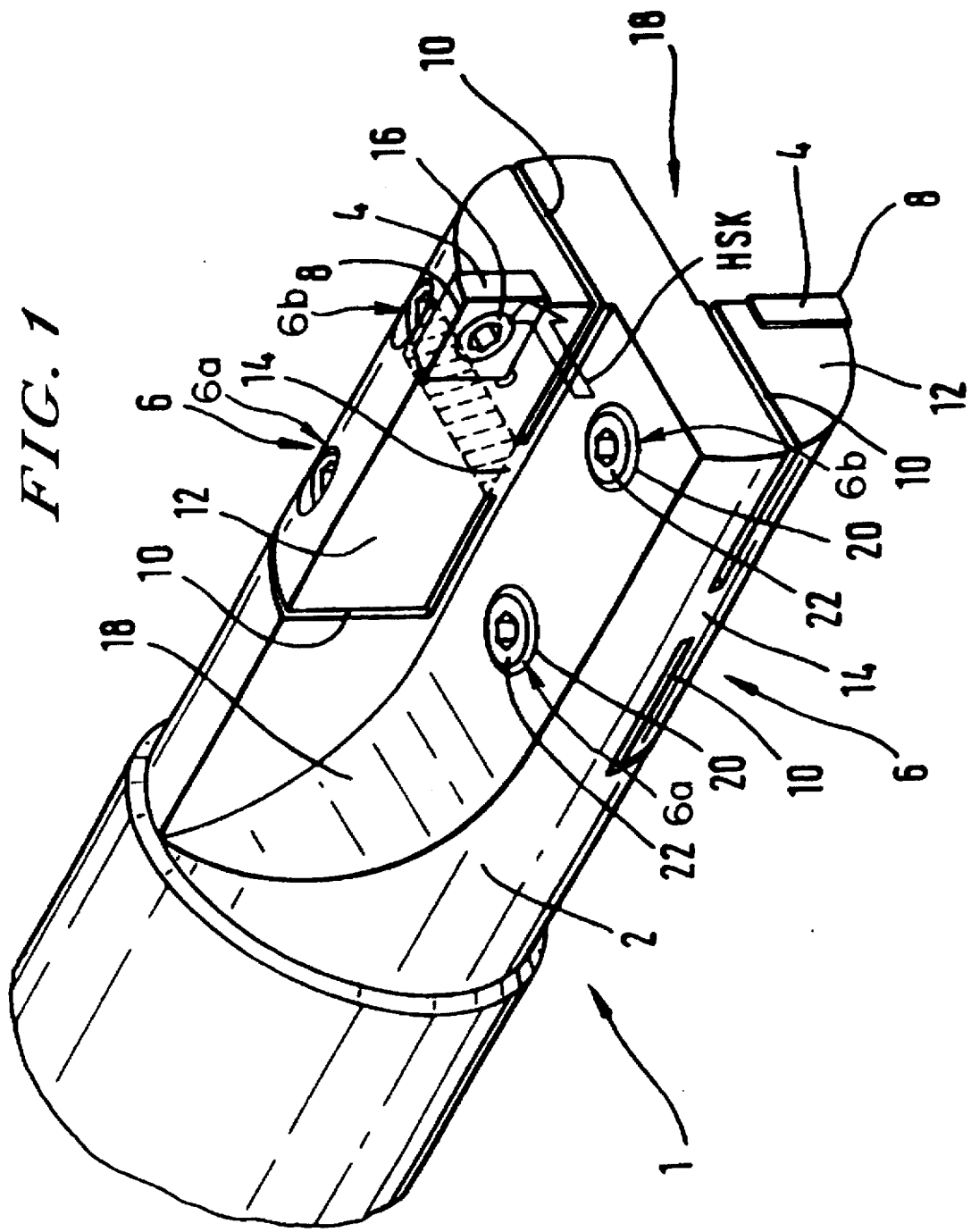
FIG. 1 shows a three-dimensional, schematically simplified view of the tool according to the invention.

FIG. 1 shows a simplified view of an embodiment of the tool 1 according to the invention. Two cutting inserts 4 are arranged on the blade carrier 2. An adjusting device 6 is used for the radial fine adjustment of the cutting edge 8 of the cutting inserts 4. The adjusting device 6 consists of an adjusting element which can be either of 6a or 6b, and a fixing element which is the other. The blade carrier 2 has slits 10 which separate two blade carrier segments 12 from the blade carrier 2. Each of the blade carrier segments 12 carries a cutting insert 4 and is connected in a radially adjustable manner and in one piece with the blade carrier 2 by way of a material joint 14. The cutting inserts 4 are fixed by means of screws 16 to the respective blade carrier segment 12. The slits 10 in part extend straight in a plane which is essentially parallel to the axis of the tool 1. The chucking groove 18 is provided with threaded bores 20 intended for holding the screw/nut tension devices 22.

Figure 2:
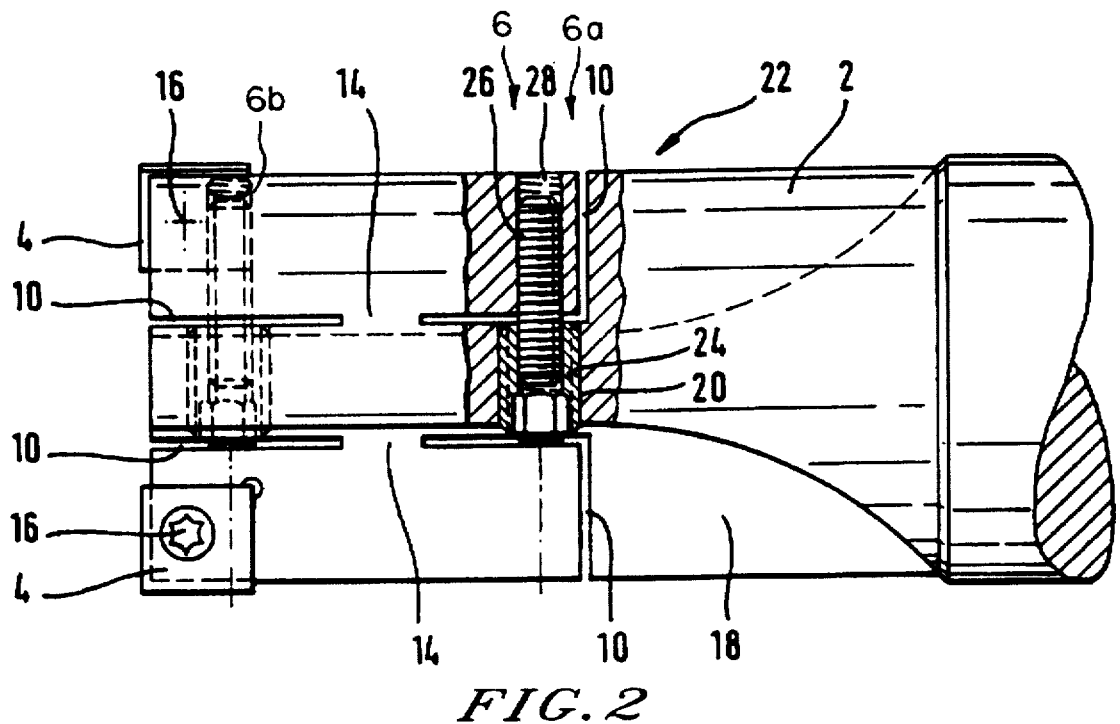
FIG. 2 shows a lateral view of a first embodiment of the tool according to the invention with a cut-away.

FIG. 2 shows the lateral view of the first embodiment. The chucking groove 18 in the blade carrier 2 holds threaded bores 20 into which a threaded jacket 24 is screwed. A setscrew 26 is screwed into a threaded bore 28 in the blade carrier segment 12. The threaded bore 20 with the threaded jacket 24 and the threaded bore 28 with the setscrew 26 cooperate and form the screw/nut tension device 22, whereby the setscrew 26 bridges over the slit 10. In this embodiment, the adjusting device 6 consists of two screw/nut tension devices 22. One screw/nut tension device 22 acts as the adjusting element which can be either of 6a or 6b, the other screw/nut tension device 22 acts as the fixing element which is the other of 6a or 6b.

Figure 3:
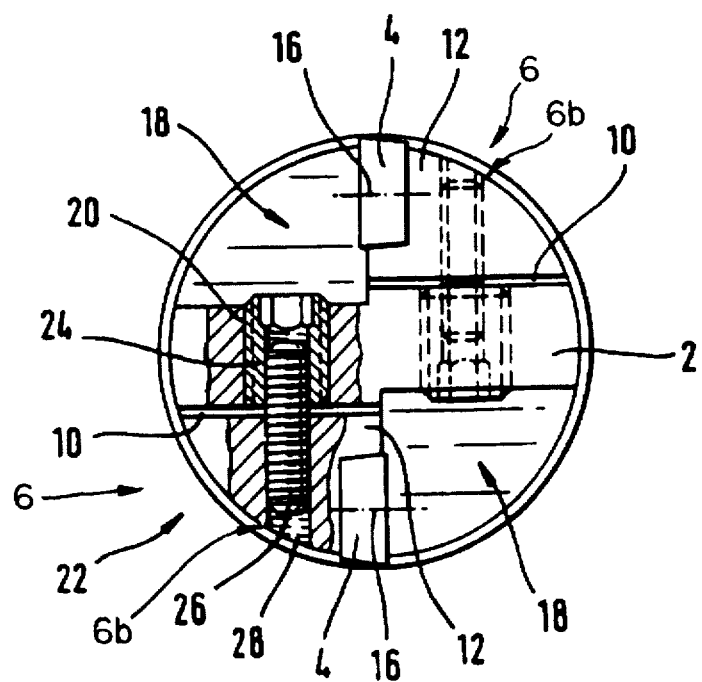
FIG. 3 shows a frontal view of the first embodiment of the tool according to the invention with a cut-away.

FIG. 3 shows the frontal view of the first embodiment. The parallel slits 10 extending vertically to the viewing plane in the direction of the longitudinal axis of the tool partially separate the blade carrier segments 12 from the blade carrier 2. Two radially opposing cutting inserts 4 are inserted into the radially opposing blade carrier segments 12 and are fixed with the screw 16. The setscrew 26 bridges over the slit 10 and engages with the threaded jacket 24, which comprises either the fixing element 6b, or the adjusting element 6b of the adjusting device 6, for a radial adjustment of the cutting insert 4. The threaded bore 20 is arranged so as to approximately align with the threaded bore 28 or be concentric to it, whereby the threaded bores are aligned in a plane parallel to the end face of the tool 1 approximately vertically to the slit 10.

Figure 4:
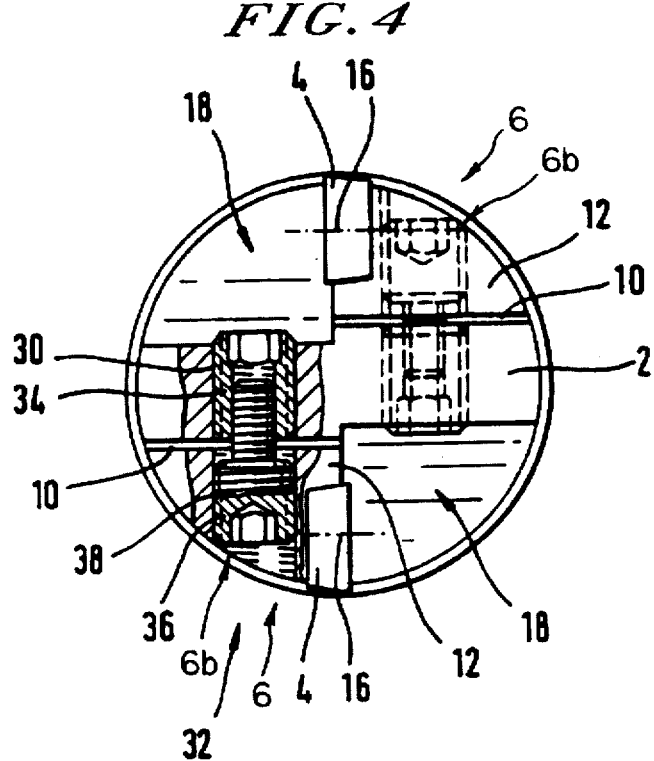
FIG. 4 shows a frontal view of a second embodiment of the tool according to the invention with a break-away.

FIG. 4 shows the frontal view of a second embodiment. The parallel slits 10 which extend vertically to the viewing plane in the direction of the longitudinal axis of the tool partially separate the blade carrier segments 12 from the blade carrier 2. Two radially opposing cutting inserts 4 are inserted into the radially opposing blade carrier segments 12 and are fixed with the screw 16. The stepped setscrew 36 bridges over the slit 10 and engages with the threaded jacket 34, which comprises either the fixing element 6b or the adjusting element 6b of the adjusting device 6, for a radial adjustment of the cutting insert 4. The threaded bore 30 is arranged so as to approximately align with the threaded bore 38 or be concentric to it, whereby the threaded bores are aligned in a plane parallel to the end face of the tool 1 approximately vertically to the slit 10 and are constructed as a through-bore having the same thread.

Figure 5:
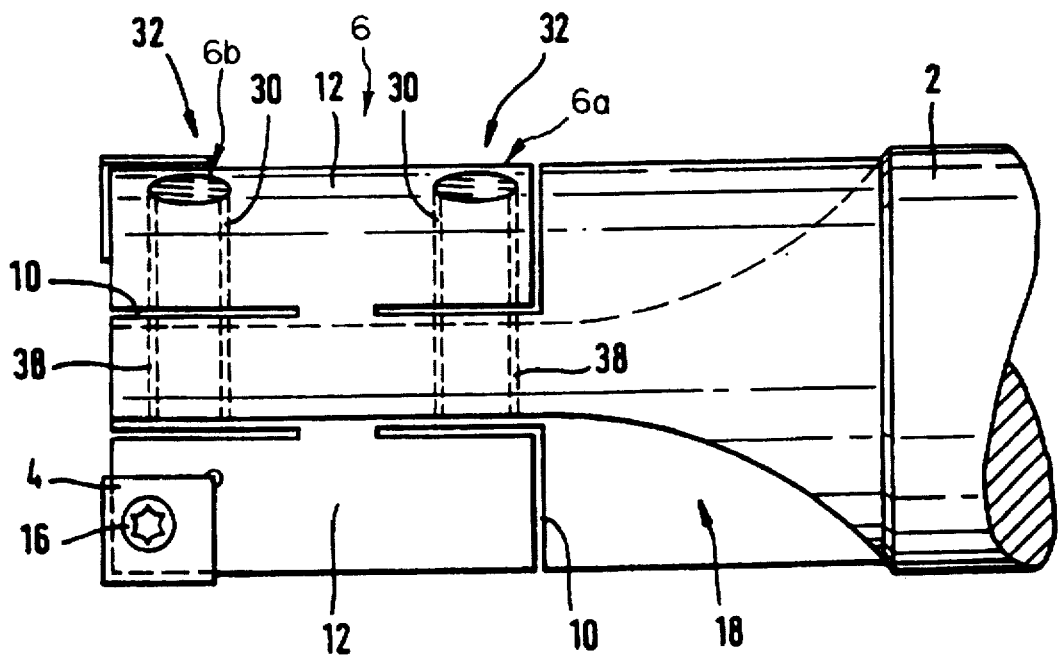
FIG. 5 shows a lateral view of the second embodiment of the tool according to the invention.

FIG. 5 shows a simplified lateral view of the second embodiment. The Chucking groove 18 in the blade carrier 2 holds threaded bores 30 into which the threaded jacket 34, which is not shown here in detail, is screwed. The setscrew 36, which is not shown here, is screwed into a threaded bore 38 in the blade carrier segment 12. The threaded bore 30 with threaded jacket 34 and the threaded bore 38 with the stepped setscrew 36 cooperate and form the screw/nut device 32, whereby the stepped setscrew 36 bridges over the slit 10, to form the fixing element, which can be either 6a or 6b, or the adjusting element, which is the other of 6a or 6b, of the adjusting device 6, the construction of which is not shown. The threaded bore 30 and the threaded bore 38 have the same thread and are constructed so as to align with each other as a threaded through-bore.

FIG. 6 shows a flow chart for the partial assembly of the second embodiment of tool 1. In the first step, the stepped setscrew 36 is screwed into the threaded jacket 34, preferably with a certain residual play of the thread engagement. The resulting pair consisting of a threaded jacket and a stepped setscrew is screwed into and through the threaded bore 38 in the blade carrier segment until the threaded jacket 34 reaches the slit 10. By working from the opposite side through the threaded bore 30, the threaded jacket 34 is now turned further by itself until it engages with the threaded bore 30. The pair consisting of the stepped setscrew 36 and the threaded jacket 34 now can be moved from both sides further together in axial direction in the threaded through-bore formed by threaded bores 30 and 38 until the stepped setscrew 36 bridges in a final position over the slit 10 and the threaded jacket 34 is positioned in the blade carrier 2 in its final position in the threaded bore 30.

As a result of the previously described assembly, the assembled unit of threaded jacket and stepped setscrew is in the inserted state at any desired location in a forceless state. This forceless state can be achieved regardless of the overlapping length Sü over which the stepped threaded section is functionally engaged with the internal thread of the threaded jacket.

As can be best seen from the detail view according to FIG. 6, the adjusting element, which can be either 6a or 6b, and the fixing element, which is the other, assembled in this manner have the advantage that the adjusting device 6 is always operated without problems, even if the respective tool for driving the adjusting device is used from one or from the other side. If according to the detail view of FIG. 6 a tool, such as for example a hexagon socket screw key, is inserted from the bottom into the stepped setscrew and the later is rotated, the threaded jacket in part 2 nevertheless remains stationary, since the friction moment is lower in the part of the thread with the smaller diameter than it is in the part of the larger thread diameter on the threaded jacket. The width of the slit 10 is thus changed reliably in a specific direction.

If reversely a tool is applied from the other side, i.e. according to the detail view of FIG. 6, from the top, the threaded jacket is first brought to rotate and then moves on the smaller thread of the stepped setscrew 36. The setscrew 36 does not rotate along, since the friction forces between threaded jacket and smaller thread of the stepped setscrew 36 act on a smaller radius than the thread support force in the head of the stepped setscrew 36. Another special advantage is that an identical rotation direction of the applied tool brings about an adjustment of the blade in the same adjusting direction, regardless of which side the tool is applied to.

Changes from the described embodiments are naturally possible without leaving the basic concept of the invention behind. The invention offers possibilities of varying the arrangement, position, and size, but also the number of slits within wide limits. A suitable ratio between blade carrier cross-section and blade carrier segment cross-section is chosen depending on the application area of the tool. And finally, the slit width is also influenced by the chosen process for producing the slit. An advantageous method for this is the wire erosion process, which makes it possible to produce a slit with a suitable width already in a single step by the choice of tool.

The expansion joint or the material joint subject to elastic deformation between blade carrier segment and blade carrier can also be varied, whereby preferably the orientation of the main cutting force is being taken into account. FIG. 1 schematically illustrates the ratios for an orientation of the main cutting force in a radial plane of the tool. It can be seen that the cross-section surface (striated) of the expansion joint is oriented essentially parallel to the main cutting force HSK.

In this way the invention creates a rotary tool 1, in particular a machining tool 1 for the fine machining of internal surfaces, with a blade carrier 2 and cutting inserts 4 preferably attached releasably thereto, in particular indexable inserts according to DIN [German Industrial Norm], whereby an adjusting device 6 for the precision adjustment of the cutting edge 8 is provided, wherein the blade carrier 2 has at least one slit 10 radially inside the cutting insert 4, thus creating a blade carrier segment 12 which can be essentially radially adjusted and which carries the cutting insert 4 and which is connected in one piece with the remaining blade carrier 2, whereby the degree of freedom of the blade carrier segment 12 permitted by the slit 10 can be stabilized via adjusting device 6.

Figure 7:
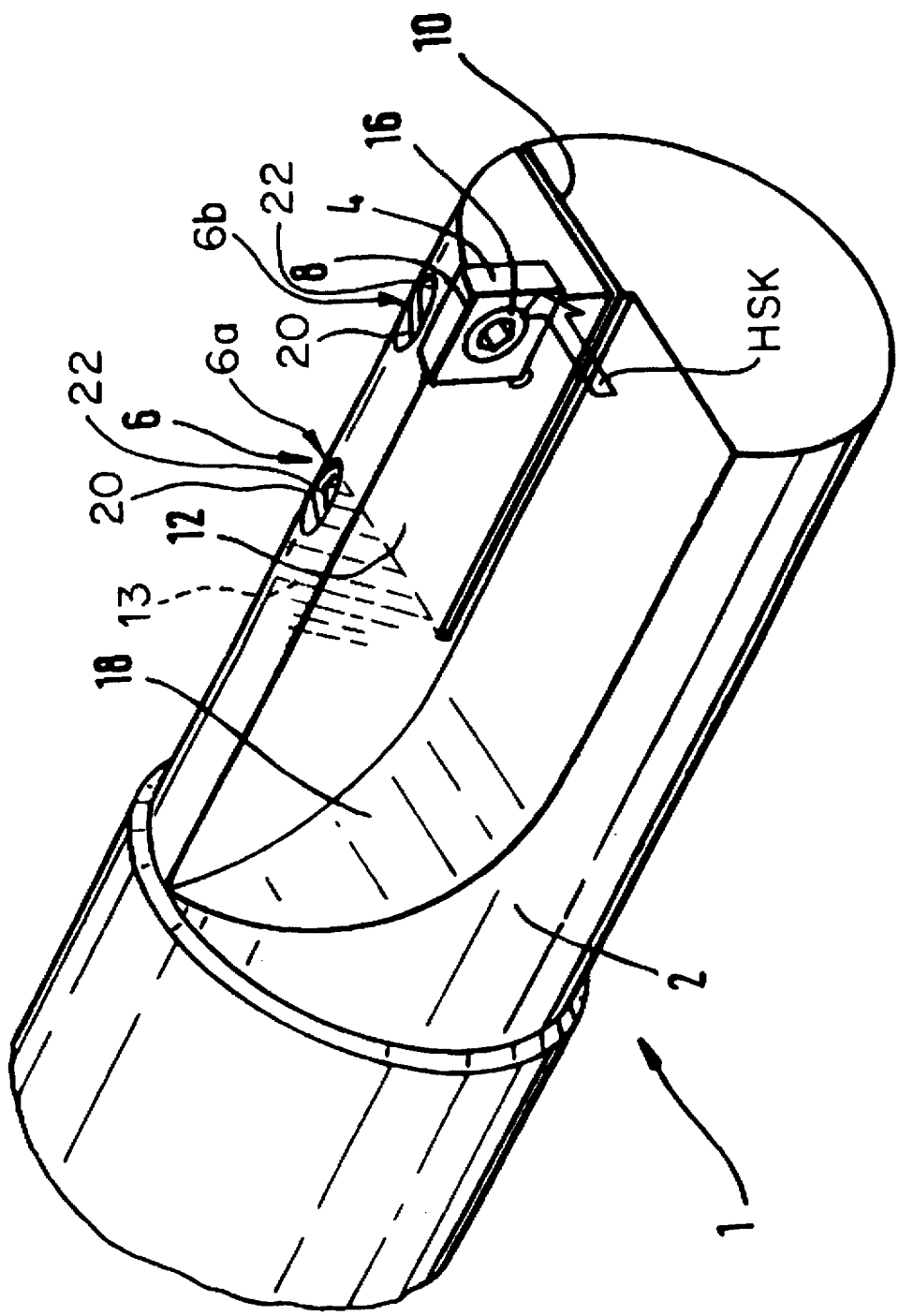
FIG. 7 shows a three-dimensional, schematically simplified view of the tool according to the invention in which a single slit is shown.
Figure 8:
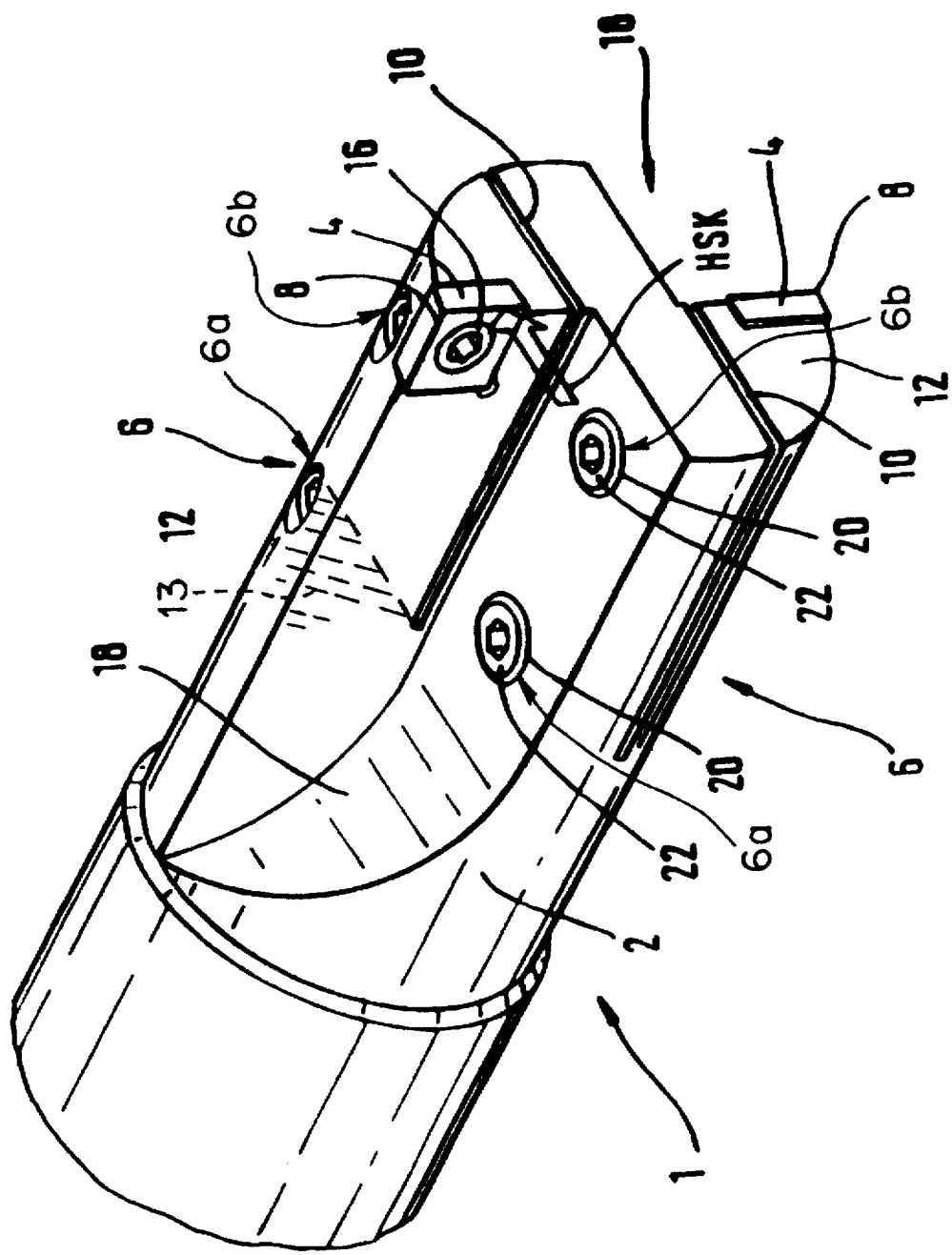
FIG. 8 shows a three-dimensional, schematically simplified view of the tool according to the invention in which multiple single slits are shown.

FIG. 7 shows another embodiment of the invention wherein a single slit 10 is used instead of the two slits of the previous embodiment, and in which there is also shown the location of a material joint 13 which connects the blade carrier segment 12 to the blade carrier 2. FIG. 8 shows the basic embodiment of the invention as shown in FIG. 7, but includes multiple single slits 10, 10. The reference numeral designations shown in FIGS. 7 and 8 designate features of the invention that are the same as the features as previously discussed for the two slit embodiment of the invention; as such, a listing of the features will not be repeated. Additionally, FIGS. 3 and 4 depict a front view of the tool 1 with a cut-away that correctly depicts the front view of the single slit embodiment shown in FIG. 8.

The operation of the single slit embodiment is similar to the two slit embodiment discussed earlier. The blade carrier segment 12 is stabilized by an adjusting device 6. In one embodiment the adjusting device 6 includes an adjusting element which can be either 6a or 6b, and a fixing element which is the other. The adjusting element which can be either 6a or 6b or the fixing element of 6a or 6b which is the other may be located near the tool 1 tip and the other of the adjusting element 6a or 6b or the fixing element the other of 6a or 6b may be located further from the tool 1 tip. The adjusting or fixing element, one of 6a or 6b, located nearest the tool 1 tip is placed in compression in order to move the cutting edge 8 to a larger cutting diameter. The other of the adjusting or fixing element, the other of 6a or 6b, located furthest from the tool 1 tip is placed in tension so as to stabilize and secure the position of the cutting edge 8.

The tension of the adjusting/fixing elements 6a, 6b can be reversed so as to locate the cutting edge 8 at a diameter which is smaller than the cutting edge diameter void of adjusting device forces.

The adjusting device 6 of this single slit embodiment, as does the two slit embodiment, can take the form of a pair of parallel and axially stacked control elements comprising the adjusting/fixing elements 6a, 6b, screw/nut tension devices 22 in conjunction with a threaded bore 20, screw/nut devices 22 constructed in accordance with the differential thread principle, screw/nut devices 22 having a setscrew 26 at one end of which is threaded into the blade carrier segment 12 and an other end threaded into a threaded jacket 24 which is in turn threaded into the blade carrier bore 20, and an adjusting device similar to the previous one except that the setscrew 36 is stepped and the threaded jacket 34 is threaded on the smaller diameter end of the setscrew 36. The operation of each is evident from the previous description and will not be discussed here.

What is claimed as new and desired to be secured by Letters Patent of the United States is:

1. A rotary tool, comprising:
   a blade carrier;
   at least one slit extending in said blade carrier in a straight line in a plane which is substantially parallel to a longitudinal axis of the rotary tool, thereby creating a blade carrier segment connected to a remainder of said blade carrier by a material joint;
   a cutting insert mounted to said blade carrier segment such that said at least one slit is located closer to the longitudinal axis of the rotary tool than is the at least one cutting insert; and
   an adjusting device comprising means for creating a first force vector and a second force vector which have opposing vector directions, the first force vector and the second force vector being substantially perpendicular to the at least one slit, said adjusting device partially located in both of said blade carrier and said blade carrier segment for radially positioning the cutting insert.

2. A machine tool for the fine machining of internal surfaces, comprising:
   a blade carrier;
   at least one slit extending in said blade carrier in a straight line in a plane which is substantially parallel to a longitudinal axis of the machine tool, thereby creating a blade carrier segment connected to a remainder of said blade carrier by a material joint;
   a cutting insert mounted to said blade carrier segment such that said at least one slit is located closer to the longitudinal axis of the machine tool than is the at least one cutting insert; and
   an adjusting device comprising means for creating a first force vector and a second force vector which have opposing vector directions, the first force vector and the second force vector being substantially perpendicular to the at least one slit, said adjusting device partially located in both of said blade carrier and said blade carrier segment for radially positioning the cutting insert.

3. A rotary tool as recited in claim 1, wherein the adjusting device has at least an adjusting element and a fixing element.

4. A rotary tool as recited in claim 3, wherein the adjusting device is formed by a pair of parallel and axially stacked control elements having axes which extend vertically to the slit.

5. A rotary tool as recited in claim 4, wherein the control elements comprise screw/nut tension devices.

6. A rotary tool as recited in claim 5, wherein the screw/nut tension devices are constructed in accordance with the differential thread principle.

7. A rotary tool as recited in claim 6, wherein the blade carrier has bores each containing an internal thread, and the blade carrier segment has bores each containing an internal thread, and each of the screw/nut tension devices has a setscrew having a first thread pitch engaged in the corresponding internal thread of the bore located in the blade carrier segment, and a threaded jacket having an internal thread with the same pitch as the setscrew and an external thread of a different pitch than the setscrew engaged with a corresponding internal thread of the blade carrier bore, and each threaded jacket internal thread engaged with each respective setscrew for adjusting the blade carrier segments.

8. A rotary tool as recited in claim 6, wherein the blade carrier has bores each containing an internal thread, the blade carrier segment has bores each containing an internal thread, the pitch of the blade carrier internal thread and the pitch of the blade carrier segment internal thread are substantially the same, each blade carrier bore axis is substantially aligned with a respective blade carrier segment bore axis collinearly, and each of the screw/nut tension devices has a stepped setscrew having a first external thread and a second external thread which engages said first external thread with a corresponding threaded bore in the blade carrier segment, said second external thread having a different pitch which has a smaller diameter than that of said first external thread and bridges the slit, and a threaded jacket having an internal thread and an external thread, the internal thread of the threaded jacket engaging the corresponding second external thread of the stepped setscrew, the external thread of the threaded jacket engaging the corresponding internal thread of the blade carrier.

9. A rotary tool as recited in claim 1, wherein the rotary tool has a chucking groove located on a recessed portion of the blade carrier adjacent to the blade carrier segment and, the at least one slit extends essentially in the plane of the chucking groove.

10. A rotary tool, comprising:
    a blade carrier;
    two slits extending in said blade carrier in a straight line in a plane which is substantially parallel to a longitudinal axis of the rotary tool, thereby creating a blade carrier segment connected in one piece with a remainder of said blade carrier by a material bridge remaining between the two slits;
    a cutting insert mounted to said blade carrier segment such that said at least one slit is located closer to the longitudinal axis of the rotary tool than is the at least one cutting insert; and
    an adjusting device comprising means for creating a first force vector and a second force vector which have opposing vector directions acting through the at least one slit so as to stabilize and position said blade carrier segment to said blade carrier, the first force vector and the second force vector being substantially perpendicular to the at least one slit, said adjusting device partially located in both of said blade carrier and said blade carrier segment, said adjusting device having at least an adjusting element and a fixing element.

11. A rotary tool as recited in claim 10, wherein the adjusting device is formed by a pair of parallel and axially stacked control elements having axes which extend vertically to the slit.

12. A rotary tool as recited in claim 11, wherein the control elements comprise screw/nut tension devices.

13. A rotary tool as recited in claim 12, wherein the screw/nut tension devices are constructed in accordance with the differential thread principle.

14. A rotary tool as recited in claim 13, wherein the blade carrier has bores each containing an internal thread, and the blade carrier segment has bores each containing an internal thread, and each of the screw/nut tension devices has a setscrew having a first thread pitch engaged in the corresponding internal thread of the bore located in the blade carrier segment, and a threaded jacket having an internal thread with the same pitch as the setscrew and an external thread of a different pitch than the setscrew engaged with a corresponding internal thread of the blade carrier bore, and each threaded jacket internal thread engaged with each respective setscrew for adjusting the blade carrier segments.

15. A rotary tool as recited in claim 13, wherein the blade carrier has bores each containing an internal thread, the blade carrier segment has bores each containing an internal thread, the pitch of the blade carrier internal thread and the pitch of the blade carrier segment internal thread are substantially the same, each blade carrier bore axis is substantially aligned with a respective blade carrier segment bore axis collinearly, and each of the screw/nut tension devices has a stepped setscrew having a first external thread and a second external thread which engages said first external thread with a corresponding threaded bore in the blade carrier segment, said second external thread having a different pitch which has a smaller diameter than that of said first external thread and bridges the slit, and a threaded jacket having an internal thread and an external thread, the internal thread of the threaded jacket engaging the corresponding second external thread of the stepped setscrew, the external thread of the threaded jacket engaging the corresponding internal thread of the blade carrier.

16. A rotary tool as recited in one of claims 10 to 15 wherein the two slits are at least partially located in a mutual plane, so that the slit farthest from the rotary tool tip is associated with the adjusting element or the fixing element of the adjusting device, and the slit closest to the rotary tool tip is associated with the fixing element or the adjusting element of the adjusting device.

17. A rotary tool as recited in one of claims 10 to 15, wherein the material bridge has a cross-sectional surface having a largest extension oriented in a peripheral direction substantially perpendicular to the longitudinal axis of the rotary tool.

18. A rotary tool as recited in one of claims 10 to 15, wherein an axial width of the material bridge is adapted to forces exerted with the adjusting device.

19. A rotary tool as recited in one of claims 10 to 15, wherein the cross-section surface of the material bridge is adapted to the cutting forces which must be introduced into the blade carrier.

* * * * *